US012811620B2

(12) United States Patent
Lu et al.

(10) Patent No.: US 12,811,620 B2
(45) Date of Patent: Nov. 24, 2026

(54) WIRELESS RADIO FREQUENCY RECEIVING DEVICE AND CONTROL METHOD TO SOLVE THE PROBLEMS OF UNSTABLE EFFECTIVE BANDWIDTH SIGNAL STRENGTH LOW SIGNAL STRENGTH AND LARGE ERROR OF DIGITAL SIGNAL GAIN CONTROL ACCURACY

(71) Applicants: Beijing BOE Technology Development Co., Ltd., Beijing (CN); BOE Technology Group Co., Ltd., Beijing (CN)

(72) Inventors: Zhipeng Lu, Beijing (CN); Xichao Fan, Beijing (CN); Biqi Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 281 days.

(21) Appl. No.: 18/614,776

(22) Filed: Mar. 25, 2024

(65) Prior Publication Data

US 2025/0062785 A1 Feb. 20, 2025

Related U.S. Application Data

(63) Continuation of application No. PCT/CN2023/113120, filed on Aug. 15, 2023.

(51) Int. Cl.
*H04B 1/40* (2015.01)
*H04B 1/00* (2006.01)

(52) U.S. Cl.
CPC ............ *H04B 1/40* (2013.01); *H04B 1/0028* (2013.01)

(58) Field of Classification Search
CPC .................... H04B 1/30; H04B 1/0475; H04B 2001/0425; H04B 2001/0433; H04B 1/16;
(Continued)

(56) References Cited

U.S. PATENT DOCUMENTS

| | | | | |
|---|---|---|---|---|
| 6,311,049 | B1 | 10/2001 | Yoshizawa | |
| 7,483,500 | B2 * | 1/2009 | Takatz | H03G 3/3052 375/345 |
| 8,605,836 | B2 * | 12/2013 | Murthy | H03G 3/3089 375/345 |
| 9,288,776 | B2 * | 3/2016 | Sun | H04L 27/0008 |
| 10,469,112 | B2 * | 11/2019 | Coban | H03F 3/195 |
| 2007/0243843 | A1 | 10/2007 | Shalash | |
| 2008/0153445 | A1 | 6/2008 | Sandner et al. | |

(Continued)

FOREIGN PATENT DOCUMENTS

| | | | |
|---|---|---|---|
| CN | 1728570 | A | 2/2006 |
| CN | 101394519 | A | 3/2009 |

(Continued)

OTHER PUBLICATIONS

Office Action dated Oct. 12, 2025 for CN 202380010132.X and English Translation.

*Primary Examiner* — Golam Sorowar

(57) ABSTRACT

The device comprises: a signal transmission link, wherein the signal transmission link comprises a radio frequency front-end chip and a radio frequency transceiver chip which are connected in series, the radio frequency front-end chip is used for converting a received wireless signal into an analog electrical signal, and amplifying and filtering the analog electrical signal, and the radio frequency transceiver chip is used for converting the analog electrical signal into a digital electrical signal; at least two detection chips respectively connected to the signal transmission link, wherein the detection chips are used for detecting a signal parameter in the series link; and a gain controller connected between an output end of the detection chip and the radio frequency front-end chip, wherein the gain controller is used for adjusting a gain coefficient of the radio frequency front-end chip according to the signal parameter.

14 Claims, 6 Drawing Sheets

(58) Field of Classification Search
CPC ...... H04B 1/005; H04B 1/0057; H04B 17/20; H04B 1/006; H04B 1/1027; H04B 1/24; H04B 1/408; H04B 2001/045; H04B 7/0413; H04B 1/406; H04B 17/318; H04B 2001/0416; H04B 1/04; H04B 1/0483; H04B 17/22; H04B 1/10; H04B 1/3805; H04B 1/403; H04B 17/21; H04B 2001/0408; H04B 1/036; H04B 1/123; H04B 1/38; H04B 17/14; H04B 17/221; H04B 7/04; H04B 1/0003; H04B 1/0014; H04B 1/0458; H04B 1/40; H04B 10/00; H04B 10/69; H04B 1/00; H04B 1/0007; H04B 1/0096
See application file for complete search history.

(56) References Cited

U.S. PATENT DOCUMENTS

2016/0182108 A1* 6/2016 Takahashi ............. H04L 25/068
455/214

FOREIGN PATENT DOCUMENTS

| | | | | |
|---|---|---|---|---|
| CN | 102187588 | A | 9/2011 | |
| CN | 104081661 | A | 10/2014 | |
| CN | 105706362 | A | 6/2016 | |
| CN | 105721373 | A | 6/2016 | |
| CN | 108988885 | A | 12/2018 | |
| CN | 114499561 | A | 5/2022 | |
| CN | 114567278 | B | 3/2023 | |
| EP | 4064575 | A1 * | 9/2022 | ............... H04B 1/30 |

* cited by examiner

WIRELESS RADIO FREQUENCY RECEIVING DEVICE AND CONTROL METHOD TO SOLVE THE PROBLEMS OF UNSTABLE EFFECTIVE BANDWIDTH SIGNAL STRENGTH LOW SIGNAL STRENGTH AND LARGE ERROR OF DIGITAL SIGNAL GAIN CONTROL ACCURACY

CROSS-REFERENCE TO RELATED APPLICATION(S)

This application is a continuation application of International PCT Application No. PCT/CN2023/113120 filed Aug. 15, 2023, which is hereby incorporated herein by reference in the entirety.

TECHNICAL FIELD

The present disclosure relates to the field of wireless communication, in particular to a wireless radio frequency receiving device and a control method thereof.

BACKGROUND

In the related technology, wireless radio frequency receiving device usually controls the power according to the input analog signal strength of the radio frequency end. However, in the wireless radio frequency receiving device, the input signal, especially the wireless signal, has the space interference signal with unstable intensity. When the power control is carried out directly according to the input signal, it will lead to the unstable or low intensity of the effective bandwidth signal finally obtained, which will affect other operations such as digital signal processing after the conversion of analog signal and digital signal, thus leading to a large error in the gain control accuracy of the output digital signal.

SUMMARY

In order to solve the problems of unstable effective bandwidth signal strength, low signal strength and large error of digital signal gain control accuracy of the wireless radio frequency receiving device, a first aspect of the present disclosure provides a wireless radio frequency receiving device, including:

- a signal transmission link including a radio frequency front-end chip and a radio frequency transceiver chip which are connected in series, wherein the radio frequency front-end chip is used for converting a received wireless signal into an analog electrical signal, and amplifying and filtering the analog electrical signal, and the radio frequency transceiver chip is used for converting the analog electrical signal into a digital electrical signal;
- at least two detection chips respectively connected to the signal transmission link, wherein the detection chips are used for detecting a signal parameter in the series link; and
- a gain controller connected between an output end of the detection chip and the radio frequency front-end chip, wherein the gain controller is used for adjusting a gain coefficient of the radio frequency front-end chip according to the signal parameter.

In one embodiment, the at least two detection chips have different connection points with the signal transmission link.

In one embodiment, the signal transmission link includes a digital filter chip connected with the radio frequency transceiver chip, and the digital filter chip is used for filtering the digital electrical signal.

In one embodiment, an input end of at least one of the detection chips is electrically connected between the radio frequency front-end chip and the radio frequency transceiver chip;

- an input end of at least one of the detection chips is electrically connected between the radio frequency transceiver chip and the digital filter chip; and
- an input end of at least one of the detection chips is electrically connected to an output end of the digital filter.

In one embodiment, it further includes:

- a digital gain control chip, wherein an input end of the digital gain control chip is connected with an output end of the digital filter chip;
- at least one of the detection chips is connected with an output end of the digital gain control chip; and
- an output end of the gain controller is connected with the digital gain control chip.

In one embodiment, the detection chip is an amplitude detection chip and/or a power detection chip.

In one embodiment, a gain coefficient corresponding to the digital gain control chip is less than a gain coefficient corresponding to the radio frequency front-end chip.

In one embodiment, it further includes:

- an antenna connected with the radio frequency front-end chip and used for receiving the wireless signal; and
- a baseband chip, wherein when the wireless radio frequency receiving device includes a digital gain control chip, the baseband chip is connected with the digital gain control chip; or
- when the wireless radio frequency receiving device includes a digital filter chip but does not include the digital gain control chip, the baseband chip is connected with the digital filter chip; or
- when the wireless radio frequency receiving device includes neither the digital filter chip nor the digital gain control chip, the baseband chip is connected with the radio frequency transceiver chip; and
- the baseband chip is used for format and interface conversion of a filtered digital signal.

In one embodiment, it further includes:

- a baseband chip, wherein an input end of the baseband chip is connected with an output end of the radio frequency transceiver chip, and the baseband chip is used for format and interface conversion of a filtered digital signal; and
- a field programmable gate array including a gain correlation interface, a digital signal interface and a signal parameter reading interface, wherein the gain correlation interface is connected with the radio frequency front-end chip, the digital signal interface is connected with an output end of the baseband chip, the signal parameter reading interface is connected with the detection chip, the field programmable gate array is used for filtering the digital electrical signal, and the field programmable gate array is further used for adjusting a gain coefficient of the radio frequency front-end chip according to a signal parameter before digital filtering processing and a signal parameter after digital filtering processing.

A second aspect of the present disclosure provides a control method for any one of the wireless radio frequency receiving devices according to the first aspect, including:

controlling the detection chip to obtain a signal parameter in the signal transmission link;

controlling the gain controller to generate a gain adjustment signal according to the signal parameter and a signal target threshold; and controlling the radio frequency front-end chip to adjust a gain coefficient according to the gain adjustment signal, so that a strength difference between a strength of a signal output by the wireless radio frequency receiving device and a target strength is within a preset range.

In one embodiment, when the wireless radio frequency receiving device includes a digital filter chip, the method further includes:

controlling the at least two detection chips to respectively obtain signal parameters corresponding to different positions of the signal transmission link connected therewith, wherein the signal parameters include a first signal parameter, a second signal parameter and a third signal parameter, the first signal parameter is a signal parameter between the radio frequency front-end chip and the radio frequency transceiver chip, the second signal parameter is a signal parameter between the radio frequency transceiver chip and the digital filter chip, and the third signal parameter is a signal parameter output by an output end of the digital filter;

generating a plurality of gain adjustment signals according to different signal parameters and different target thresholds, wherein the gain adjustment signals include a first gain adjustment signal, a second gain adjustment signal and a third gain adjustment signal, the first gain adjustment signal corresponds to the first signal parameter, the second gain adjustment signal corresponds to the second signal parameter, and the third gain adjustment signal corresponds to the third signal parameter; and controlling the radio frequency front-end chip to adjust the gain coefficient according to at least one of the first gain adjustment signal, the second gain adjustment signal and the third gain adjustment signal, so that a strength difference between a strength of a signal output by the wireless radio frequency receiving device and a target strength is within a preset range.

In one embodiment, the method further includes:

controlling the radio frequency front-end chip to adjust the gain coefficient sequentially according to the first gain adjustment signal, the second gain adjustment signal and the third gain adjustment signal, so that a strength difference between a strength of a signal output by the wireless radio frequency receiving device and a target strength is within the preset range.

In one embodiment, when the wireless radio frequency receiving device includes a digital gain control chip, the method further includes:

generating a digital gain adjustment signal according to different signal parameters and different target thresholds; and adjusting the gain coefficient corresponding to the digital gain control chip according to the digital gain adjustment signal, so that a strength difference between a strength of a signal output by the wireless radio frequency receiving device and a target strength is within a preset range.

In one embodiment, the gain coefficient corresponding to the digital gain control chip is less than a gain coefficient corresponding to the radio frequency front-end chip.

In one embodiment, when the wireless radio frequency receiving device includes a field programmable gate array, the method includes:

controlling the programmable gate array to filter the digital electrical signal; and controlling the programmable gate array to adjust a gain coefficient of the radio frequency front-end chip according to a signal parameter before digital filtering processing and a signal parameter after digital filtering processing.

DETAILED DESCRIPTION

Figure 1:
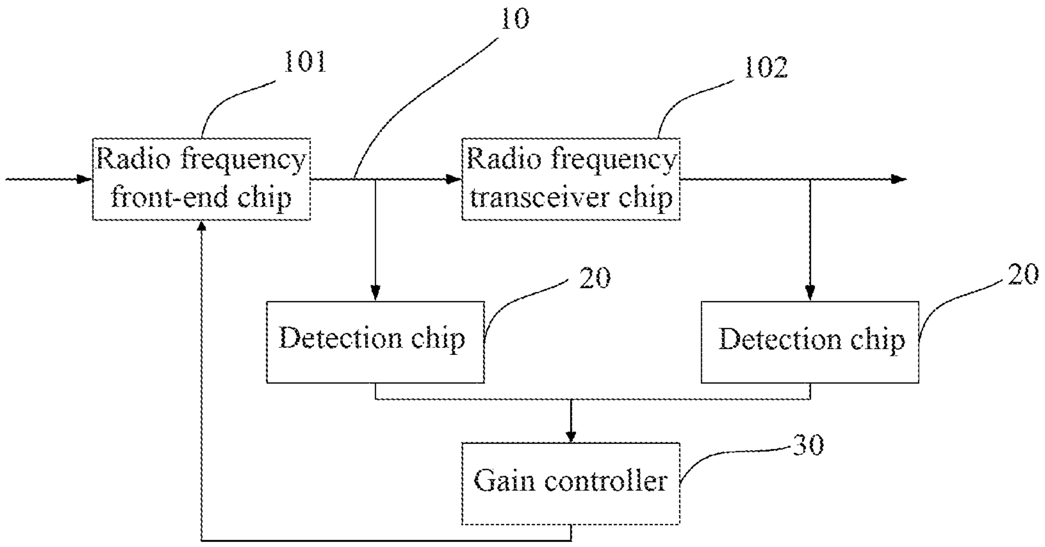
FIG. 1 shows a schematic structural diagram of a wireless radio frequency receiving device according to an embodiment of the present disclosure.

A first aspect of the present disclosure provides a wireless radio frequency receiving device. Referring to FIG. 1, it is a schematic structural diagram of a wireless radio frequency receiving device according to an embodiment of the present disclosure, including:

a signal transmission link 10 including a radio frequency front-end chip 101 and a radio frequency transceiver chip 102 which are connected in series, wherein the radio frequency front-end chip 101 is used for converting a received wireless signal into an analog electrical signal, and amplifying and filtering the analog electrical signal, and the radio frequency transceiver chip 102 is used for converting the analog electrical signal into a digital electrical signal;

at least two detection chips 20 respectively connected to the signal transmission link 10, wherein the detection chips 20 are used for detecting a signal parameter in the series link; and a gain controller 30 connected between an output end of the detection chip 20 and the radio frequency front-end chip 101, wherein the gain controller 30 is used for adjusting a gain coefficient of the radio frequency front-end chip 101 according to the signal parameter.

For example, as shown in FIG. 1, the radio frequency front-end chip 101 and the radio frequency transceiver chip 102 are electrically connected to form a signal transmission link 10. The radio frequency front-end chip 101 refers to a chip located at a front end of the wireless radio frequency receiving device and is mainly responsible for amplifying, filtering, modulating and other operations of a radio frequency signal. The radio frequency transceiver chip 102 integrates radio frequency receiving and transmitting circuits, and may receive a radio frequency signal from an antenna, convert it into a baseband signal, and then send the baseband signal to a baseband processor for further processing. At the same time, it may also convert the baseband signal into a radio frequency signal and send it to an antenna to realize bidirectional communication in a wireless communication system.

At least two detection chips 20 are connected in the signal transmission link 10 for measuring signal parameters in the transmission link, and the signal parameters may include a signal strength and a signal amplitude. It should be noted that the at least two detection chips 20 may be connected at the same connection point (not shown in the figure) or at different connection points to obtain a plurality of signal parameters.

The detection chip 20 is connected with the gain controller 30, and the gain controller 30 is connected with the radio frequency front-end chip 101. The gain controller 30 compares the signal parameter obtained by the detection chip 20 with a target threshold, and generates a gain adjustment signal according to the comparison result. The radio frequency front-end chip 101 adjusts the gain coefficient according to the gain adjustment signal, so as to adjust a strength of a signal output by the radio frequency gain receiving device, so that a difference between the signal strength and the target strength is within a preset range and meets the requirement of control accuracy.

To sum up, according to the wireless radio frequency receiving device provided by the present disclosure, a plurality of signal parameters are measured through at least two detection chips 20 connected in at least a transmission link, the plurality of signal parameters are compared with a target threshold, a plurality of gain adjustment signals are generated according to the plurality of comparison results, the gain coefficient is gradually adjusted through the plurality of gain adjustment signals, and the gain coefficient is gradually adjusted through the plurality of signal parameters, thus overcoming the technical problem that the bandwidth signal strength cannot meet the preset requirement when directly controlling according to the input signal in the related technology, effectively improving the accuracy of gain control and outputting an effective digital signal with more stable strength.

In one embodiment, the at least two detection chips 20 have different connection points with the signal transmission link 10.

As shown in FIG. 1, for example, one detection chip 20 may be connected with the radio frequency front-end chip 101 and the radio frequency transceiver chip 102 for measuring a strength of an analog signal which may include a peak and/or a power. A gain of the radio frequency front-end chip 101 is controlled according to the strength of the analog signal measured by the detection chip 20, so that the feedback speed is faster, and the electronic equipment in the radio frequency receiving device may be effectively protected to prevent the power or peak of the analog signal from exceeding the radio frequency period tolerance. The other detection chip 20 may be connected behind the radio frequency front-end chip 101 for measuring a strength of a digital signal, which may include a power of the digital signal. By measuring the power of the digital signal, the measurement result is more accurate. By adjusting the gain of the radio frequency front-end chip 101 through the power of the digital signal, the accuracy of gain control may be further improved.

To sum up, according to the radio frequency receiving device provided by the embodiment of the present disclosure, strengths of a plurality of different types of signals may be measured through at least two detection chips 20 connected at different connection points in the signal transmission link 10, thereby making hierarchical control and adjustment of the gain of the radio frequency receiving device according to the strengths of different types of signals, and effectively improving the use safety of the radio frequency receiving device and the accuracy of gain control.

In one embodiment, the signal transmission link 10 includes a digital filter chip 40, which is connected with the radio frequency transceiver chip 102, and is used for filtering the digital electrical signal.

Figure 2:
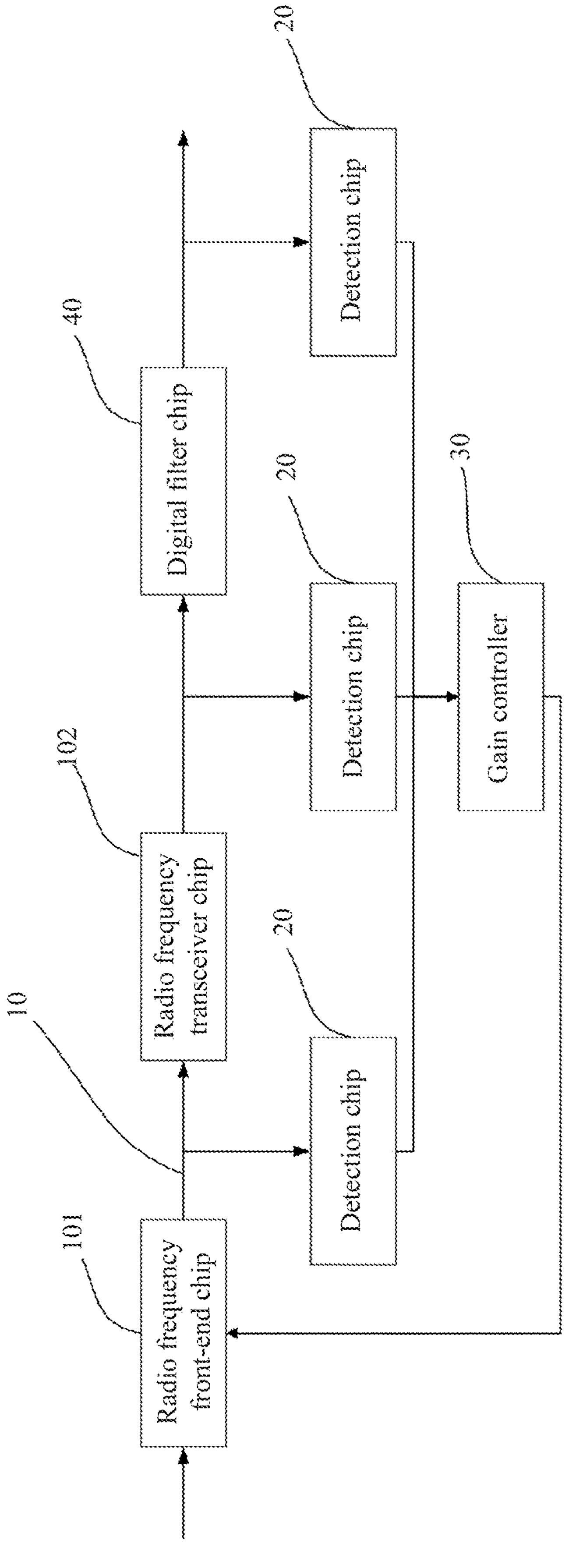
FIG. 2 shows a schematic structural diagram of a wireless radio frequency receiving device according to another embodiment of the present disclosure.

As an example, as shown in FIG. 2, it is a schematic structural diagram of another radio frequency receiving device provided in the present disclosure. The signal transmission link 10 further includes a digital filter chip 40 connected with an output end of the radio frequency transceiver chip 102. The digital filter chip 40 is mainly used for filtering, denoising or spectrum analysis and the like of the digital signal. The digital filter chip 40 may process signals quickly in real-time applications, and has the characteristics of high speed, accuracy and programmability. The digital filter chip 40 is typically composed of an analog front end, a digital signal processor (DSP) and a control interface.

In one embodiment, an input end of at least one of the detection chips 20 is electrically connected between the radio frequency front-end chip 101 and the radio frequency transceiver chip 102;

an input end of at least one of the detection chips 20 is electrically connected between the radio frequency transceiver chip 102 and the digital filter chip 40; and an input end of at least one of the detection chips 20 is electrically connected to an output end of the digital filter chip 40.

As an example, as shown in FIG. 2, the input end of one detection chip 20 may be connected with the radio frequency front-end chip 101 and the radio frequency transceiver chip 102 for measuring a strength of an analog signal which may include a peak and/or a power. A gain of the radio frequency front-end chip 101 is controlled according to the strength of the analog signal measured by the detection chip 20, so that the feedback speed is faster, and the electronic equipment in the radio frequency receiving device may be effectively protected to prevent the power or peak of the analog signal from exceeding the radio frequency period tolerance. The input end of another detection chip 20 may be connected behind the radio frequency front-end chip 101 for measuring a strength of a digital signal, which may include a power of the digital signal. By measuring the power of the digital signal, the measurement result is more accurate. By adjusting the gain of the radio frequency front-end chip 101 through the power of the digital signal, the accuracy of gain control may be further improved. The input end of the other detection chip 20 may be connected with an output end of the digital filter chip 40, and the detection chip 20 is used for detecting a strength of the filtered digital signal, so that the result of the signal strength measured by the chip is more accurate. The gain control is performed according to the measured result, so that the control accuracy is more precise.

To sum up, according to the radio frequency receiving device of the embodiment of the present disclosure, signal strength is respectively measured between the radio frequency front-end chip 101 and the radio frequency transceiver chip 102, between the radio frequency transceiver chip 102 and the digital filter chip 40, and at the output end of the digital filter chip 40 in a signal link, and the controlling is performed from high to low according to the signal strength detection at three places and the corresponding gain control response priority. Compared with the radio frequency receiving device in related technologies, this radio frequency receiving device may also detect the power of effective signals after digital filtering, control the signal gain and feedback, and may output effective digital signals with more stable strength.

In one embodiment, it further includes:

a digital gain control chip 70, wherein an input end of the digital gain control chip 70 is connected with an output end of the digital filter chip 40;

at least one of the detection chips 20 is connected with an output end of the digital gain control chip 70; and an output end of the gain controller 30 is connected with the digital gain control chip 70.

Figure 4:
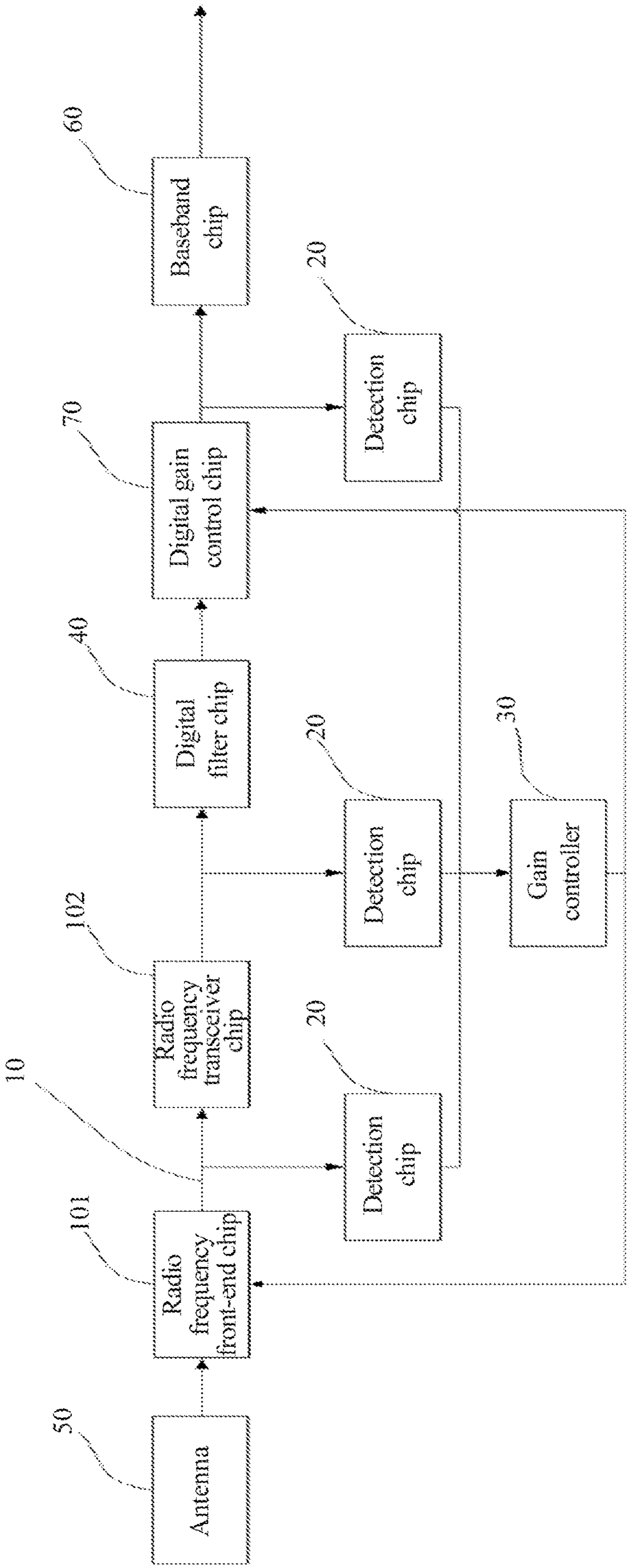
FIG. 4 shows a schematic structural diagram of a wireless radio frequency receiving device according to still another embodiment of the present disclosure.

Exemplarily, as shown in FIG. 4, it is a schematic structural diagram of a wireless radio frequency receiving device according to still another embodiment of the present disclosure. The signal transmission link 10 further includes a digital gain control chip 70, an input end of the digital gain control chip 70 is connected with an output end of the digital filter chip 40, and at least one of the detection chips 20 is connected with an output end of the digital gain control chip 70 for measuring a signal strength controlled by the digital gain chip 70. In addition, the radio frequency receiving device may further include two other detection chips 20, one of which is used for measuring a strength of an analog signal behind the radio frequency front-end chip 101 and the other for measuring a strength of a digital signal behind the radio frequency transceiver chip 102. An output end of the gain controller 30 is connected with the radio frequency front-end chip 101 and the digital gain control chip 70 at the same time, and gain coefficients of the radio frequency front-end chip 101 and the digital gain control chip 70 are respectively controlled according to three different types of signal strengths measured by three detection chips 20, thereby adjusting the strength of the signal output by the signal output link.

To sum up, according to the radio frequency receiving device of the embodiment of the present disclosure, the gains in the radio frequency front-end chip 101 and the digital gain control chip 70 are respectively controlled by three different types of signal strengths, so that the accuracy of gain control may be further improved by coordinated control over a large gain at the front end and a small gain at the back end.

In one embodiment, the detection chip 20 is an amplitude detection chip 20 and/or a power detection chip 20.

Exemplarily, the amplitude detection chip 20 is used for measuring an amplitude of a signal, i.e., a magnitude of amplitude of the signal. It may sample and process the input signal, calculate the amplitude of the signal, and output the corresponding amplitude information. The power detection chip 20 is mainly used for measuring a power of a signal, that is, an energy size of the signal. It may sample and process the input signal, calculate the power value of the signal, and output the corresponding power information. Through the cooperation of amplitude detection and power detection, the signal strength at different nodes in the signal link may be obtained more accurately.

In one embodiment, the gain coefficient corresponding to the digital gain control chip 70 is less than the gain coefficient corresponding to the radio frequency front-end chip 101.

For example, the gain coefficient corresponding to the digital gain control chip 70 is less than the gain coefficient corresponding to the radio frequency front-end chip 101. Through coordinated control over the larger front-end gain and the smaller back-end gain, the accuracy of the gain control is further improved.

In one embodiment, it further includes:

an antenna 50, connected with the radio frequency front-end chip 101, for receiving the wireless signal; and a baseband chip 60, wherein when the wireless radio frequency receiving device includes a digital gain control chip 70, the baseband chip 60 is connected with the digital gain control chip 70; or when the wireless radio frequency receiving device includes a digital filter chip 40 but does not include the digital gain control chip 70, the baseband chip 60 is connected with the digital filter chip 40; or when the wireless radio frequency receiving device includes neither the digital filter chip 40 nor the digital gain control chip 70, the baseband chip 60 is connected with the radio frequency transceiver chip 102; and the baseband chip 60 is used for format and interface conversion of a filtered digital signal.

Exemplarily, the antenna 50 is an apparatus for transmitting and receiving electromagnetic waves, and mainly for converting electromagnetic waves into electrical signals in a reception mode or converting electrical signals into electromagnetic waves in a transmission mode. The antenna 50 is disposed in a wireless communication system to be responsible for receiving wireless signals from a base station or other device.

The baseband chip 60 is a chip responsible for processing baseband signals in a wireless communication system. Baseband signal refers to an unmodulated low frequency signal, which includes audio, video, data and other information. The baseband chip 60 is mainly responsible for modulating, demodulating, encoding, decoding, modem and other processing of baseband signals, and format and interface conversion of filtered digital signals.

Figure 3:
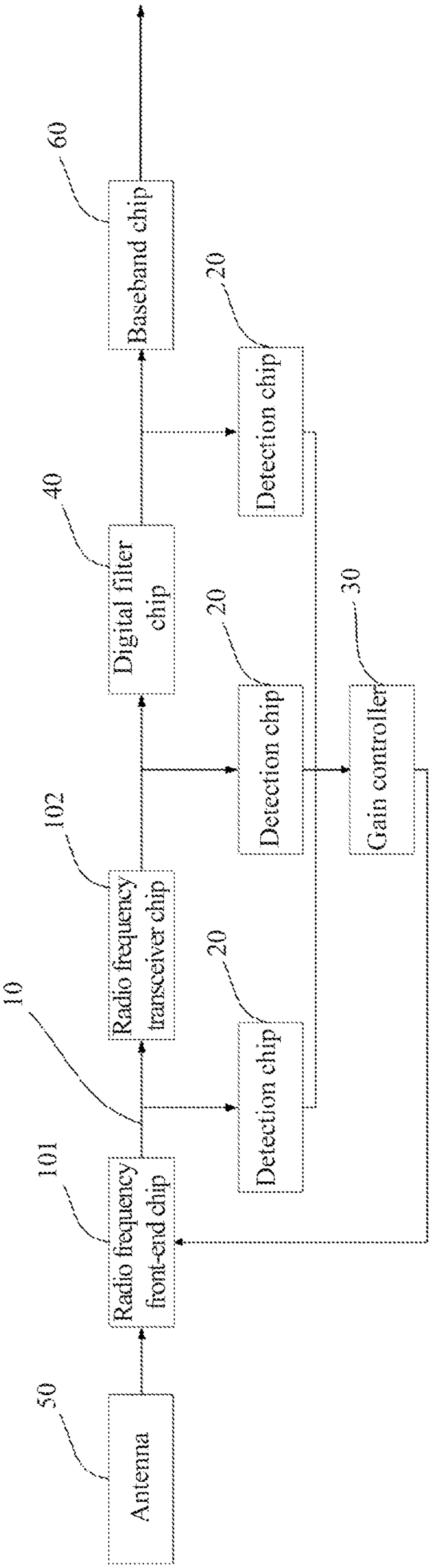
FIG. 3 shows a schematic structural diagram of a wireless radio frequency receiving device according to yet another embodiment of the present disclosure.

As shown in FIG. 4, when the wireless radio frequency receiving device includes a digital gain control chip 70, the baseband chip 60 is connected with the digital gain control chip 70;

as shown in FIG. 3 which is a schematic structural diagram of a wireless radio frequency receiving device according to yet another embodiment of the present disclosure, when the wireless radio frequency receiving device includes a digital filter chip 40 but does not include the digital gain control chip 70, the baseband chip 60 is connected with the digital filter chip 40; or as shown in FIG. 1 which is a schematic diagram of a corresponding device structure when the wireless radio frequency receiving device includes neither the digital filter chip 40 nor the digital gain control chip 70, the baseband chip 60 is connected with the radio frequency transceiver chip 102, and this structure is simpler since it does not include the digital filter chip 40.

In one embodiment, it further includes:

a baseband chip 60, wherein an input end of the baseband chip 60 is connected with an output end of the radio frequency transceiver chip 102, and the baseband chip 60 is used for format and interface conversion of a filtered digital signal; and a field programmable gate array 80 including a gain correlation interface, a digital signal interface and a signal parameter reading interface, wherein the gain correlation interface is connected with the radio frequency front-end chip 101, the digital signal interface is connected with an output end of the baseband chip 60, the signal parameter reading interface is connected with the detection chip 20, the field programmable gate array 80 is used for filtering the digital electrical signal, and the field programmable gate array 80 is further used for adjusting a gain coefficient of the radio frequency front-end chip 101 according to a signal parameter before digital filtering processing and a signal parameter after digital filtering processing.

Figure 5:
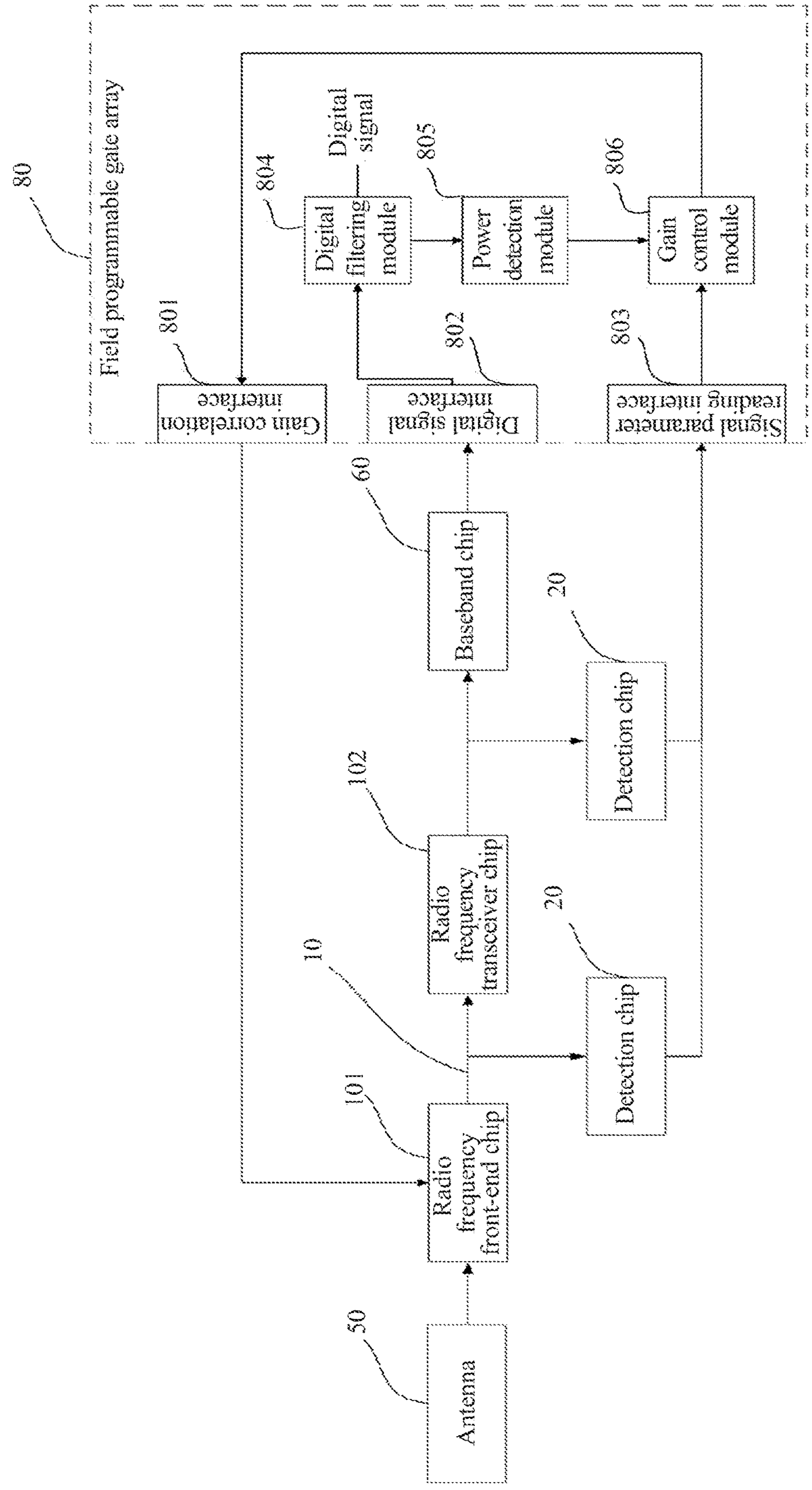
FIG. 5 shows a schematic structural diagram of a wireless radio frequency receiving device according to a further embodiment of the present disclosure.

Exemplarily, the field programmable gate array 80 (FPGA) is a reconfigurable integrated circuit chip. Compared with traditional fixed-function integrated circuits, FPGA is programmable, and may be configured and reconfigured according to users' needs to realize specific functions and logic circuits. As shown in FIG. 5 which is a schematic structural diagram of a further wireless radio frequency receiving device proposed by the present disclosure, the field programmable gate array 80 includes a gain correlation interface 801, a digital signal interface 802 and a signal parameter reading interface 803. Meanwhile, the field programmable gate array 80 further includes a digital filtering module 804, a power detection module 805 and a gain control module 806. The gain correlation interface 801 is connected with the radio frequency front-end chip 101, the digital signal interface 802 is connected with an output end of the baseband chip 60, the signal parameter reading interface 803 is connected with the detection chip 20, the digital filtering module 804 of the field programmable gate array 80 is used for filtering the digital electrical signal, the power detection module 805 of the field programmable gate array 80 is used for measuring a strength of a filtered digital electrical signal, and the gain control module 806 of the field programmable gate array 80 is used for adjusting a gain coefficient of the radio frequency front-end chip 101 according to a signal parameter before digital filter processing and a signal parameter after digital filter processing. The signal parameter before digital filtering may include one or more of an analog signal strength behind the radio frequency front-end chip 101 and a digital signal strength behind the radio frequency transceiver chip 102.

To sum up, according to the radio frequency receiving device of the embodiment of the present disclosure, both the digital filtering and signal power detection are realized by programming in the FPGA, and the FPGA is connected with the front-end electronic equipment through the gain correlation interface, the digital signal interface and the signal parameter reading interface. Such structure design may simplify the structure of the radio frequency transceiver device, optimize the product size, and reduce the cost. In addition, the function may be realized more flexibly in the FPGA, the response is faster.

Figure 6:
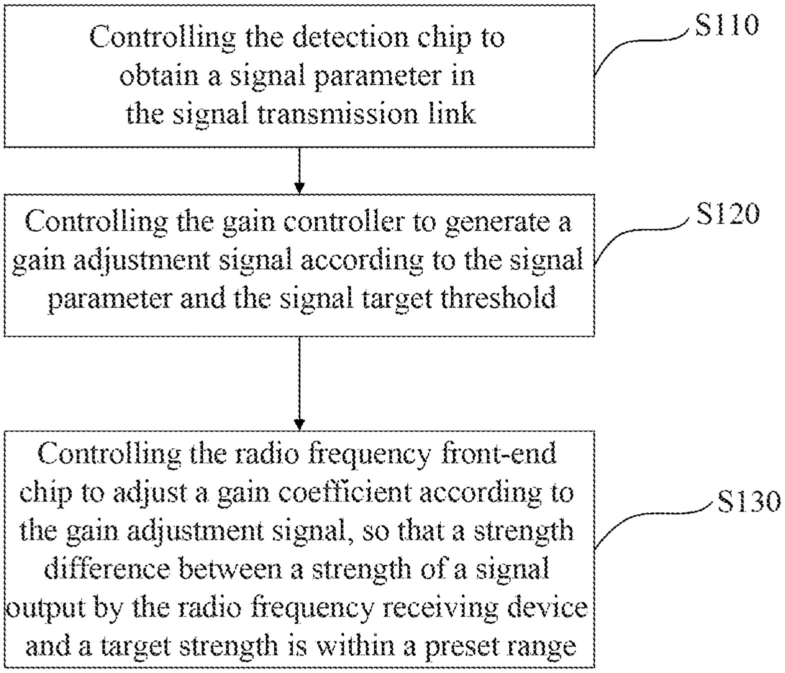
FIG. 6 shows a flowchart of a control method of a wireless radio frequency receiving device according to an embodiment of the present disclosure.

A second aspect of the present disclosure provides a control method. Referring to FIG. 6 which is a flowchart of a control method of a wireless radio frequency receiving device according to an embodiment of the present disclosure, the control method is used for any one of the wireless radio frequency receiving devices according to the first aspect, and it includes:

S110, controlling the detection chip 20 to obtain a signal parameter in the signal transmission link;

S120, controlling the gain controller 30 to generate a gain adjustment signal according to the signal parameter and the signal target threshold; and S130, controlling the radio frequency front-end chip 101 to adjust a gain coefficient according to the gain adjustment signal, so that a strength difference between a strength of a signal output by the radio frequency receiving device and a target strength is within a preset range.

Exemplarily, as shown in FIG. 1, at least two detection chips 20 are connected in a signal transmission link 10, for measuring signal parameters in the transmission link, and the signal parameters may include a signal strength and a signal amplitude. It should be noted that the at least two detection chips 20 may be connected at the same connection point (not shown in the figure) or at different connection points to obtain a plurality of signal parameters. The detection chip 20 is connected with the gain controller 30, and the gain controller 30 is connected with the radio frequency front-end chip 101. The gain controller 30 compares the signal parameter obtained by the detection chip 20 with a target threshold, and generates a gain adjustment signal according to the comparison result. The radio frequency front-end chip 101 adjusts the gain coefficient according to the gain adjustment signal, so as to adjust a strength of a signal output by the radio frequency gain receiving device, so that a difference between the signal strength and the target strength is within a preset range and meets the requirement of control accuracy.

To sum up, according to the control method of a wireless radio frequency receiving device provided by the present disclosure, a plurality of signal parameters are measured through at least two detection chips 20 connected in at least a transmission link, the plurality of signal parameters are compared with a target threshold, a plurality of gain adjustment signals are generated according to the plurality of comparison results, the gain coefficient is gradually adjusted through the plurality of gain adjustment signals, and the gain coefficient is gradually adjusted through the plurality of signal parameters, thus overcoming the technical problem that the bandwidth signal strength cannot meet the preset requirement when directly controlling according to the input signal in the related technology, effectively improving the accuracy of gain control and outputting an effective digital signal with more stable strength.

In one embodiment, when the wireless radio frequency receiving device includes a digital filter chip 40, the method further includes:

controlling the at least two detection chips 20 to respectively obtain signal parameters corresponding to different positions of the connected signal transmission link 10, wherein the signal parameters include a first signal parameter, a second signal parameter and a third signal parameter, the first signal parameter is a signal parameter between the radio frequency front-end chip 101 and the radio frequency transceiver chip 102, the second signal parameter is a signal parameter between the radio frequency transceiver chip 102 and the digital filter chip 40, and the third signal parameter is a signal parameter output by an output end of the digital filter;

generating a plurality of gain adjustment signals according to different signal parameters and different target thresholds, wherein the gain adjustment signals include a first gain adjustment signal, a second gain adjustment signal and a third gain adjustment signal, the first gain adjustment signal corresponds to the first signal parameter, the second gain adjustment signal corresponds to the second signal parameter, and the third gain adjustment signal corresponds to the third signal parameter; and controlling the radio frequency front-end chip 101 to adjust the gain coefficient according to at least one of the first gain adjustment signal, the second gain adjustment signal and the third gain adjustment signal, so that a strength difference between a strength of a signal output by the wireless radio frequency receiving device and a target strength is within a preset range.

Exemplarily, according to the radio frequency transceiver device shown in FIG. 2, the input end of one detection chip 20 may be connected with the radio frequency front-end chip 101 and the radio frequency transceiver chip 102 for measuring a strength of an analog signal, i.e., the first signal parameter, wherein the strength of the analog signal may include a peak and/or a power. The input end of another detection chip 20 may be connected behind the radio frequency front-end chip 101 for measuring a strength of a digital signal, i.e., the second signal parameter, wherein the strength of the digital signal may include a power of the digital signal. The input end of the other detection chip 20 may be connected with an output end of the digital filter chip 40, and the detection chip 20 is used for detecting a strength of the filtered digital signal, i.e., the third signal parameter.

A first gain adjustment signal is generated by comparing the first signal parameter with a first target threshold, and a gain of the radio frequency front-end chip 101 is adjusted according to the first gain adjustment signal, so that the feedback speed is faster, the electronic equipment in the radio frequency receiving device may be effectively protected, and the analog signal power or peak value may be prevented from exceeding the radio frequency period tolerance. The second gain adjusting signal is generated by comparing the second signal parameter with the second target threshold, the gain of the radio frequency front-end chip 101 is adjusted according to the second gain adjusting signal, and the power of the digital signal is measured, so that the measurement result is more accurate. The adjustment of the gain of the radio frequency front-end chip 101 by the digital signal power may further improve the accuracy of gain control. The third gain adjustment signal is generated by comparing the third signal parameter with the third target threshold, and the gain of the radio frequency front-end chip 101 is adjusted according to the third gain adjustment signal, so that the result of the signal strength measured by the chip is more accurate. The gain control is performed according to the measured result, so that the control accuracy is more precise.

To sum up, according to the control method of a radio frequency receiving device of the embodiment of the present disclosure, signal strength is respectively measured between the radio frequency front-end chip 101 and the radio frequency transceiver chip 102, between the radio frequency transceiver chip 102 and the digital filter chip 40, and at the output end of the digital filter chip 40 in a signal link, and, and at the output end of the digital filter chip 40, and one or more of the signal strength measurement results are selected to control the gain coefficient.

Thus, the feedback speed and adjustment accuracy of gain coefficient adjustment may be flexibly controlled according to different application environments and different control requirements.

In one embodiment, the method further includes:

controlling the radio frequency front-end chip to adjust the gain coefficient sequentially according to the first gain adjustment signal, the second gain adjustment signal and the third gain adjustment signal, so that a strength difference between a strength of a signal output by the wireless radio frequency receiving device and a target strength is within the preset range.

Exemplarily, a first gain adjustment signal is generated by comparing the first signal parameter with a first target threshold, and a gain of the radio frequency front-end chip 101 is adjusted according to the first gain adjustment signal, so that the feedback speed is faster, the electronic equipment in the radio frequency receiving device may be effectively protected, and the analog signal power or peak value may be prevented from exceeding the radio frequency period tolerance. The second gain adjusting signal is generated by comparing the second signal parameter with the second target threshold, the gain of the radio frequency front-end chip 101 is adjusted according to the second gain adjusting signal, and the power of the digital signal is measured, so that the measurement result is more accurate. The adjustment of the gain of the radio frequency front-end chip 101 by the digital signal power may further improve the accuracy of gain control. The third gain adjustment signal is generated by comparing the third signal parameter with the third target threshold, and the gain of the radio frequency front-end chip 101 is adjusted according to the third gain adjustment signal, so that the result of the signal strength measured by the chip is more accurate. The gain control is performed according to the measured result, so that the control accuracy is more precise.

To sum up, according to the control method of a radio frequency receiving device of the embodiment of the present application, signal strength is respectively measured between the radio frequency front-end chip 101 and the radio frequency transceiver chip 102, between the radio frequency transceiver chip 102 and the digital filter chip 40, and at the output end of the digital filter chip 40 in a signal link, and the controlling is performed from high to low according to the signal strength detection at three places and the corresponding gain control response priority. Compared with the radio frequency receiving device in related technologies, this radio frequency receiving device may also detect the power of effective signals after digital filtering, control the signal gain and feedback, and may output effective digital signals with more stable strength.

In one embodiment, when the wireless radio frequency receiving device includes a digital gain control chip 70, the method further includes:

generating a digital gain adjustment signal according to different signal parameters and different target thresholds; and adjusting the gain coefficient corresponding to the digital gain control chip 70 according to the digital gain adjustment signal, so that a strength difference between a strength of a signal output by the wireless radio frequency receiving device and a target strength is within a preset range.

Exemplarily, the signal transmission link 10 further includes a digital gain control chip 70, an input end of the digital gain control chip 70 is connected with an output end of the digital filter chip 40, and at least one of the detection chips 20 is connected with an output end of the digital gain control chip 70 for measuring a signal strength controlled by the digital gain chip 70. In addition, the radio frequency receiving device may further include two other detection chips 20, one of which is used for measuring a strength of an analog signal behind the radio frequency front-end chip 101 and the other for measuring a strength of a digital signal behind the radio frequency transceiver chip 102. An output end of the gain controller 30 is connected with the radio frequency front-end chip 101 and the digital gain control chip 70 at the same time, and gain coefficients of the radio frequency front-end chip 101 and the digital gain control chip 70 are respectively controlled according to three different types of signal strengths measured by three detection chips 20, thereby adjusting the strength of the signal output by the signal output link.

In some embodiments, the gain coefficient corresponding to the digital gain control chip 70 is less than the gain coefficient corresponding to the radio frequency front-end chip 101.

For example, the gain coefficient corresponding to the digital gain control chip 70 is less than the gain coefficient corresponding to the radio frequency front-end chip 101. Through coordinated control over the larger front-end gain and the smaller back-end gain, the accuracy of the gain control is further improved.

To sum up, according to the control method of a radio frequency receiving device of the embodiment of the present disclosure, the gains in the radio frequency front-end chip 101 and the digital gain control chip 70 are respectively controlled by three different types of signal strengths, so that the accuracy of gain control may be further improved by coordinated control over a large gain at the front end gain and a small gain at the back end.

In one embodiment, when the wireless radio frequency receiving device includes a field programmable gate array 80, the method includes:

- controlling the programmable gate array to filter the digital electrical signal; and
- controlling the programmable gate array to adjust a gain coefficient of the radio frequency front-end chip 101 according to a signal parameter before digital filtering processing and a signal parameter after digital filtering processing.

Exemplarily, as shown in FIG. 5 which is a schematic structural diagram of a further wireless radio frequency receiving device proposed by the present disclosure, the field programmable gate array 80 includes a gain correlation interface, a digital signal interface and a signal parameter reading interface. Meanwhile, the field programmable gate array further includes a digital filtering module 804, a power detection module 805 and a gain control module 806. The gain correlation interface is connected with the radio frequency front-end chip 101, the digital signal interface is connected with an output end of the baseband chip 60, the signal parameter reading interface is connected with the detection chip 20, the digital filtering module 804 of the field programmable gate array 80 is used for filtering the digital electrical signal, the power detection module 805 of the field programmable gate array 80 is used for measuring a strength of a filtered digital electrical signal, and the gain control module 806 of the field programmable gate array is used for adjusting a gain coefficient of the radio frequency front-end chip 101 according to a signal parameter before digital filter processing and a signal parameter after digital filter processing. The signal parameter before digital filtering may include one or more of an analog signal strength behind the radio frequency front-end chip 101 and a digital signal strength behind the radio frequency transceiver chip 102.

To sum up, according to the control method of a radio frequency receiving device of the embodiment of the present disclosure, both the digital filtering and signal power detection are realized by programming in the FPGA, and the FPGA is connected with the front-end electronic equipment through the gain correlation interface, the digital signal interface and the signal parameter reading interface. Such structure design may simplify the structure of the radio frequency transceiver device, optimize the product size, and reduce the cost. In addition, the function may be realized more flexibly in the FPGA, the response is faster.

It should be noted that in the above embodiments, the description of each embodiment has its own emphasis, and for parts not described in detail in a certain embodiment, reference may be made to the related descriptions of other embodiments.

The above embodiments are only used to illustrate the technical schemes of the present application, but not to limit it. Although the present application has been described in detail with reference to the above embodiments, it should be understood by those skilled in the art that the technical schemes described in the above embodiments can still be amended or some technical features thereof may be equivalently replaced. These amendments or substitutions do not depart the essence of the corresponding technical schemes from the spirit and scope of the technical schemes of the embodiments of the present application.

Although preferred embodiments of the present disclosure have been described, those skilled in the art may make additional changes and modifications to these embodiments once basic inventive concepts are known. Therefore, the appended claims are intended to be interpreted to encompass preferred embodiments as well as all changes and modifications falling within the scope of the present disclosure.

Apparently, those skilled in the art may make various modifications and variations to the present invention without departing from the spirit and scope of the present invention. Thus, if these modifications and variations to the present invention are within the scope of the claims of the present invention and their equivalent techniques, the present invention is intended to include these modifications and variations.

The invention claimed is:

1. A wireless radio frequency receiving device, comprising:

- a signal transmission link comprising a radio frequency front-end chip and a radio frequency transceiver chip which are connected in series, wherein the radio frequency front-end chip is used for converting a received wireless signal into an analog electrical signal, and amplifying and filtering the analog electrical signal, and the radio frequency transceiver chip is used for converting the analog electrical signal into a digital electrical signal;
- at least two detection chips respectively connected to the signal transmission link, wherein the detection chips are used for detecting a signal parameter in the series link; and
- a gain controller connected between an output end of the detection chips and the radio frequency front-end chip, wherein the gain controller is used for adjusting a gain coefficient of the radio frequency front-end chip according to the signal parameter; wherein the wireless radio frequency receiving device further comprises:
- a baseband chip, wherein an input end of the baseband chip is connected with an output end of the radio frequency transceiver chip, and the baseband chip is used for format and interface conversion of a filtered digital signal; and
- a field programmable gate array comprising a gain correlation interface, a digital signal interface and a signal parameter reading interface, wherein the gain correlation interface is connected with the radio frequency front-end chip, the digital signal interface is connected with an output end of the baseband chip, the signal parameter reading interface is connected with the detection chips, the field programmable gate array is used for filtering the digital electrical signal, and the field programmable gate array is further used for adjusting a gain coefficient of the radio frequency front-end chip according to a signal parameter before digital filtering processing and a signal parameter after digital filtering processing.

2. The wireless radio frequency receiving device according to claim 1, wherein the at least two detection chips have different connection points with the signal transmission link.

3. The wireless radio frequency receiving device according to claim 1, wherein the signal transmission link comprises a digital filter chip connected with the radio frequency transceiver chip, and the digital filter chip is used for filtering the digital electrical signal.

4. The wireless radio frequency receiving device according to claim 3, wherein an input end of at least one of the detection chips is electrically connected between the radio frequency front-end chip and the radio frequency transceiver chip;

an input end of at least one of the detection chips is electrically connected between the radio frequency transceiver chip and the digital filter chip; and an input end of at least one of the detection chips is electrically connected to an output end of the digital filter chip.

5. The wireless radio frequency receiving device according to claim 3, further comprising:

a digital gain control chip, wherein an input end of the digital gain control chip is connected with an output end of the digital filter chip;

at least one of the detection chips is connected with an output end of the digital gain control chip; and an output end of the gain controller is connected with the digital gain control chip.

6. The wireless radio frequency receiving device according to claim 1, wherein the detection chips are amplitude detection chips, power detection chips, or amplitude detection chips and power detection chips.

7. The wireless radio frequency receiving device according to claim 5, wherein a gain coefficient corresponding to the digital gain control chip is less than a gain coefficient corresponding to the radio frequency front-end chip.

8. The wireless radio frequency receiving device according to claim 1, further comprising:

an antenna connected with the radio frequency front-end chip and used for receiving the wireless signal; and a baseband chip, wherein when the wireless radio frequency receiving device comprises a digital gain control chip, the baseband chip is connected with the digital gain control chip; or when the wireless radio frequency receiving device comprises a digital filter chip but does not comprise the digital gain control chip, the baseband chip is connected with the digital filter chip; or when the wireless radio frequency receiving device comprises neither the digital filter chip nor the digital gain control chip, the baseband chip is connected with the radio frequency transceiver chip; and the baseband chip is used for format and interface conversion of a filtered digital signal.

9. A control method of a wireless radio frequency receiving device according to claim 1, comprising:

controlling the detection chips to obtain a signal parameter in the signal transmission link;

controlling the gain controller to generate a gain adjustment signal according to the signal parameter and a signal target threshold; and controlling the radio frequency front-end chip to adjust a gain coefficient according to the gain adjustment signal, so that a strength difference between a strength of a signal output by the wireless radio frequency receiving device and a target strength is within a preset range.

10. The method according to claim 9, wherein when the wireless radio frequency receiving device comprises a digital filter chip, the method further comprises:

controlling the at least two detection chips to respectively obtain signal parameters corresponding to different positions of the signal transmission link connected therewith, wherein the signal parameters comprise a first signal parameter, a second signal parameter and a third signal parameter, the first signal parameter is a signal parameter between the radio frequency front-end chip and the radio frequency transceiver chip, the second signal parameter is a signal parameter between the radio frequency transceiver chip and the digital filter chip, and the third signal parameter is a signal parameter output by an output end of the digital filter chip;

generating a plurality of gain adjustment signals according to different signal parameters and different target thresholds, wherein the gain adjustment signals comprise a first gain adjustment signal, a second gain adjustment signal and a third gain adjustment signal, the first gain adjustment signal corresponds to the first signal parameter, the second gain adjustment signal corresponds to the second signal parameter, and the third gain adjustment signal corresponds to the third signal parameter; and controlling the radio frequency front-end chip to adjust the gain coefficient according to at least one of the first gain adjustment signal, the second gain adjustment signal and the third gain adjustment signal, so that the strength difference between the strength of the signal output by the wireless radio frequency receiving device and the target strength is within the preset range.

11. The control method according to claim 10, further comprising:

controlling the radio frequency front-end chip to adjust the gain coefficient sequentially according to the first gain adjustment signal, the second gain adjustment signal and the third gain adjustment signal, so that the strength difference between the strength of the signal output by the wireless radio frequency receiving device and the target strength is within the preset range.

12. The control method according to claim 9, wherein when the wireless radio frequency receiving device comprises a digital gain control chip, the method further comprises:

generating a digital gain adjustment signal according to different signal parameters and different target thresholds; and adjusting a gain coefficient corresponding to the digital gain control chip according to the digital gain adjustment signal, so that the strength difference between the strength of the signal output by the wireless radio frequency receiving device and a target strength is within the preset range.

13. The control method according to claim 12, wherein the gain coefficient corresponding to the digital gain control chip is less than a gain coefficient corresponding to the radio frequency front-end chip.

14. The control method according to claim 9, wherein when the wireless radio frequency receiving device comprises a field programmable gate array, the method further comprises:

controlling the field programmable gate array to filter the digital electrical signal; and controlling the field programmable gate array to adjust a gain coefficient of the radio frequency front-end chip according to a signal parameter before digital filtering processing and a signal parameter after digital filtering processing.

* * * * *